Jan. 3, 1961 H. SINGER 2,967,067
JOINT FOR PIPES AND TUBES
Filed July 9, 1956
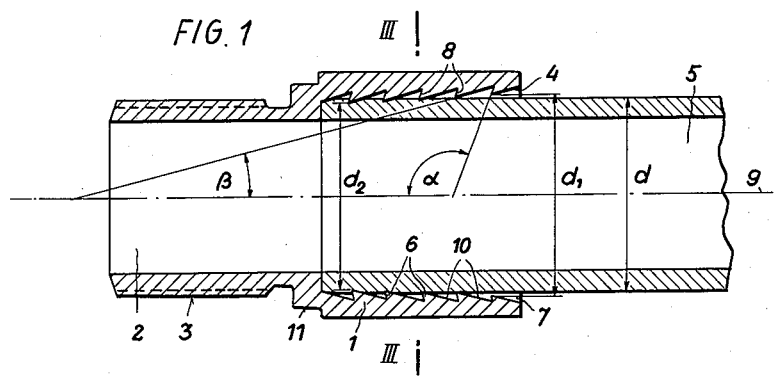
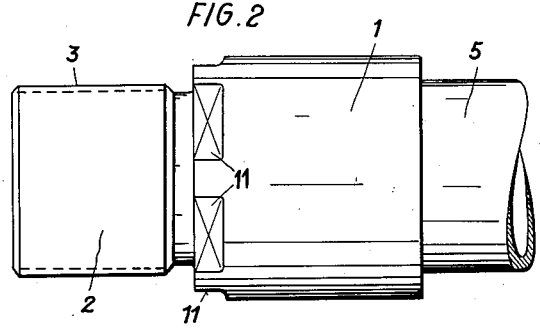 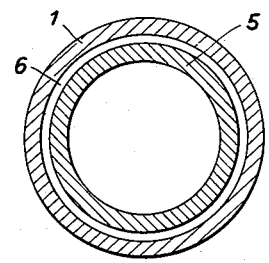
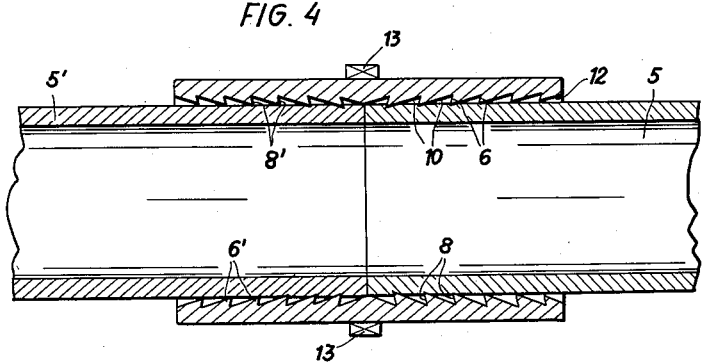
INVENTOR
H. Singer
BY
Glascock Downing Seebold
ATTORNEYS

United States Patent Office 2,967,067
Patented Jan. 3, 1961

2,967,067
JOINT FOR PIPES AND TUBES

Heinrich Singer, Aigen-Glas, near Salzburg, Austria, assignor to Interowa Fürer-Haimendorf Kommanditgesellschaft für Kunststoffhandel, Vienna, Austria Filed July 9, 1956, Ser. No. 596,475

Claims priority, application Austria Mar. 9, 1956

1 Claim. (Cl. 285—238)

The invention relates to a joint for pipes and tubes, and more particularly to a joint member for pipes and tubes of plastic or the like material, designed to connect soft or flexible pipes or tubes with metallic pipes or machine parts and the like, or to interconnect two or more plastic pipes or tubes, respectively. The joint according to the invention can be designed as an elbow to make possible sharp directional changes in pipelines.

The joint according to the invention is mainly characterized by a cylindrical member for insertion of a pipe or tube end therein, this cylindrical member being provided on its inner wall with annular ribs of toothshaped cross-section directed towards the axis of the cylindrical member. The flanks of the annular ribs which are averted from the outer open end of the cylindrical member suitably forming a greater angle with the longitudinal axis of the cylindrical member than the flanks which face the opening of the cylindrical member.

According to the invention the averted flanks of the annular ribs form with the longitudinal axis of the cylindrical member an angle of 85–110°, preferably of 90–100°. This size of the flank angle has proved to be advantageous to ensure the tight seat of the tube or pipe in the joint. It is of advantage to choose the crest diameter of the annular ribs somewhat smaller than the outside diameter of the pipe or tube. As a limit, both diameters could be approximately identical. According to the invention, the diameter of the opening in the cylindrical member at the root of the ribs should be greater than the outside diameter of the pipe or tube. It has proved to be of advantage to let the crest diameter of the annular ribs decrease starting from the opening. At the opening the crest diameter should be greater, for example 1% greater than the outside diameter of the inserted pipe or tube. Thus the insertion of the pipe or tube is facilitated and a tight seat is guaranteed even if the allowable tolerance of the outside diameter of the pipe is surpassed.

The joint according to the invention facilitates quick and reliable connection between plastic pipes or tubes without aid of special tools or special machining or other treatment of the pipe or tube ends. With the aid of the specially designed annular ribs the pipe can quite easily be inserted into the opening of the joint, but it is not easily removed because of the steep vertical averted and toothshaped protrusions which hold the pipe in a firm grip. In operation the internal pressure forces the flexible wall of the pipe against the toothshaped protrusions, thus being obtained the advantageous effect that the greater the internal pressure and therefore the stress on the connection, the tighter is the bond between pipe and joint.

Other advantages of the joint member according to the invention will become apparent from the following specification and the accompanying drawings, wherein:

Fig. 1 is a longitudinal section of the joint according to the invention;

Fig. 2 is a side elevational view of the joint member according to Fig. 1;

Fig. 3 is a cross-section of the joint on the line III—III of Fig. 1, and

Fig. 4 is a longitudinal section of a modified embodiment of the invention.

As illustrated in the drawings, the joint according to the invention consists, if it is designed to connect soft or flexible plastic pipes with metallic pipes, machine parts and the like, of a metallic socket 1 or the like which projects from one end of the connection pipe 2 having a thread 3. The opening 4 in the cylindrical member is provided with averted sawtooth-shaped annular ribs 6. These annular ribs, according to Fig. 1, extend inwardly toward the axis of the cylindrical member and are sawtooth-shaped in cross-section. The flanks 8 of the annular ribs averted from the opening, form together with the longitudinal axis 9 of the opening the relatively large angle $\alpha$ while the flanks 10 which face the opening and form the angle $\beta$ which is smaller than the angle $\alpha$. The angle $\alpha$ is formed between the flanks 8 and the longitudinal axis 9 is in the embodiment shown in the drawing approximately 110°.

To ensure the tight seat of the pipe or tube in the opening 4 of the joint the diameter of the annular ribs is somewhat smaller than the outside diameter of the pipe or tube. Therefore the pipe or tube must be forced into the opening of the joint. Because of the annular ribs 6 which act like barbs, as well as on account of the internal pressure inside the pipe which forces the flexible wall of the pipe against the ribs of the joint, an absolutely tight seat and therefore good sealing of the pipe in the opening is established. It has proved to be advantageous to select the crest diameter of the annular ribs 6 of the joint between 1½–4% smaller than the outside diameter of the pipe which is to be inserted into the joint. The annular ribs 6 may eventually be divided into sections.

To facilitate the insertion of pipes and tubes 5 into the joint and still to preserve the tight and reliable seat the design is, as Fig. 1 shows, chosen in a way that the crest diameter $d_1$ of the annular ribs 6 near the opening is somewhat larger than the outer diameter of the pipe or tube 5, for instance 1%. Beginning from the opening 7 the crest diameter of the annular ribs 6 decreases continually. On the opposite side of the opening the crest diameter $d_2$ is smaller, for example 2% smaller than the outside diameter $d$ of the inserted pipe or tube 5. The root diameter of the annular ribs is throughout the whole of the joint greater than the outside diameter $d$ of the pipe or tube 5.

The outside of the socket or opening of the joint may be of any suitable shape. For example, the joint may be provided with faces 11, shaped and arranged to fit the faces of a wrench.

Fig. 4 is a longitudinal section of a modified type of the joint. This type is designed to interconnect two flexible pipes or tubes. For this purpose the borehole or opening 12 extends throughout the whole joint. The averted annular ribs 6, 6' are so designed that the steeper flanks 8, 8' are directed toward the vertical plane of symmetry of the joint. In this way the inserted ends 5, 5' of the pipes to be connected are secured against losing contact with the joint. The performance of this joint is in all other respects the same as in the type according to Figs. 1–3.

Of course, a joint according to Fig. 4 can be machined with two boreholes with different diameters for the coupling of pipes or tubes with different gauge. It is also possible to connect more than two pipes or tubes in one common joint. The surface of the joint can bear protrusions 13 which serve as working faces for tools or a hammer.

What I claim is:

A connection fitting for plastic pipes and the like, comprising a one-piece body of non-deformable material having opposite ends and a cylindrical bore extending longitudinally of the body between said ends, means at one end of the body for connecting the body to conduit means for registry with said bore, the wall of the bore being provided with a plurality of axially spaced inwardly directed ribs, each of said ribs forming a complete annulus of tri-angular cross-section, the apex of each rib providing a sharp pipe engaging annular edge, the side walls of the ribs facing the end of the body opposite the connecting means being at a relatively small angle to the axis of the body, and the side walls opposing the opposite end of the body being at an angle of at least 90° to the axis of the body whereby said annular edges are directed inwardly from the opposite end of the body, the diameters of said annular edges gradually decreasing from the opposite end of the body inwardly thereof, the diameter of the annular edge of at least the outermost rib being greater than the normal outer diameter of the pipe, the diameter of at least the innermost annular edge being less than the normal outer diameter of the pipe, each two adjacent ribs providing an annular groove defined by the side wall of one rib facing the opposite end of the body and the side wall of the adjacent rib opposing the opposite end and each of said grooves having a diameter greater than the outer diameter of the pipe so that when a pipe end portion is inserted into the cylindrical bore through the opposite end, at least some of the annular edges are pressed into the outer surface of the pipe end portion thereby providing a seal between such annular edges and the outer surface of the pipe end portion with the pressure of the medium in the pipe also serving to force the outer surface of the pipe end portion between such edges at least partially into the groove to increase the sealing effect between such annular edges.

References Cited in the file of this patent

UNITED STATES PATENTS

| | | |
|---|---|---|
| 1,117,840 | Hamilton | Nov. 17, 1914 |
| 1,684,713 | Norgren | Sept. 18, 1928 |
| 1,776,615 | Boothman et al. | Sept. 23, 1930 |
| 1,996,855 | Cheswright | Apr. 9, 1935 |
| 2,366,814 | Smith | Jan. 9, 1945 |
| 2,485,976 | Main | Oct. 25, 1949 |
| 2,580,818 | Mundy et al. | Jan. 1, 1952 |
| 2,707,116 | Hardwick | Apr. 26, 1955 |
| 2,787,480 | Staller | Apr. 2, 1957 |
| 2,831,711 | Leadbetter | Apr. 22, 1958 |

FOREIGN PATENTS

| | | |
|---|---|---|
| 167,582 | Switzerland | May 16, 1934 |
| 705,373 | Great Britain | Mar. 10, 1954 |